United States Patent Office 3,189,566
Patented June 15, 1965

3,189,566
LIQUID RESIN COMPOSITIONS FOR SHELL MOLD-
ING AND METHODS FOR THEIR PRODUCTION
Akira Shinjo, Saheki-gun, Hiroshima-ken, Japan, assignor
to Toyo Kogyo Company Limited, Hiroshima-ken,
Japan
No Drawing. Filed Dec. 9, 1959, Ser. No. 858,325
Claims priority, application Japan, Dec. 9, 1958,
33/35,644, 33/35,645, 33/35,646, 33/35,647
5 Claims. (Cl. 260—17.5)

This invention relates to liquid resin compositions for shell molding and methods for their production.

It is an object of this invention to produce a low-cost liquid resin composition possessing properties suitable as resin material for coating sand to be used in shell molding process.

Another object of this invention is to produce a liquid resin composition which particularly is much cheaper than and whose characteristics compare favorably with the hitherto known liquid phenol resin. This is achieved by employing, independently or as a principal component, the lignin phenolic condensate created by condensing the lignin of the waste liquid of pulp, which hitherto had no utility value, and phenols.

Furthermore, it is an object of this invention to produce a lower cost liquid resin composition with characteristics comparing favorably with the hitherto known liquid phenol resin, by employing a natural resin such as rosin, cumarone, etc.

Heretofore, a dry mixture of silica sand and powdered phenol resin was employed as molding material in shell molding process, but more recently, so-called coated sand wherein each grain of sand is individually coated with liquid phenol resin, has come to be used instead, and the superior characteristics and economical nature of this material has greatly contributed to the remarkable growth of the shell molding process. However, the liquid phenol resin which is the principal material for this process is still very costly which fact is the greatest bottleneck hampering the full development of the shell molding process.

In the light of these circumstances, it is the object of this invention to provide a liquid resin material, and a method for producing it for use in the production of coated sand. This resin material possesses characteristics comparing favorably with and particularly being much cheaper than the hitherto known liquid phenol resin, and comprises liquid phenolic condensate or lignin phenolic condensate, both of relatively low molecular weight and containing a suitable amount of free phenol and water content, and, also, contains one or several kinds of natural resin such as rosin, cumarone, etc., independently or together with a solvent; or else a part of the said natural resin such as rosin, cumarone, etc., is contained in the material as a condensate with a liquid phenolic condensate or a liquid lignin phenolic condensate.

Further, this invention provides a new method of producing a liquid phenolic resin composition and a liquid lignin phenolic resin composition which form the main component of the aforementioned liquid resin composition and can be employed independently as a resin material for the coated sand as well.

Ordinarily, in the shell molding process, molding is performed under relatively low temperature without hardly any pressure being applied, thus the resin material employed therein is required to possess special properties as compared with those employed for the conventional mold products, but further special characteristics are required of resin material for the coated sand to be used in shell molding process. In other words, taking into consideration the coating process and the molding operation involved, the resin material for the coated sand must possess these special characteristics: it must be normally liquid, composed of relatively low molecular weight condensate of primarily monomers and dimers, with an adequate amount of free phenol and water content remaining in the condensate, favorable stability and, above all, fast curing speed.

This invention, therefore, relates to a liquid resin composition possessing characteristics suitable for use as resin material for the coated sand, wherein a natural resin such as rosin, cumarone, etc., is mixed, either independently, or in the condition of being partially condensated with the relatively low molecular weight liquid phenolic condensate or liquid lignin phenolic condensate, which is composed of free phenols possessing characteristics of both the novolak and resol types; and further, if required, a solvent such as alcohol, ketone, etc., is added. The method according to the invention is comprised of, first of all, adding formalin to the phenol or a mixture of phenols and lignin (to be crushed as much as possible so that it will pass through a 100 mesh), or to the said mixture of phenols and lignin which has been additionally reacted by use of an acid catalyst; then a novolak reaction is effected with the use of a highly concentrated acid catalyst, at a comparatively low temperature, which is initially considerably restricted. and, while controlling it so that it rises gradually, a phenolic condensate or a lignin phenolic condensate of relatively low molecular weight is produced, which is neutralized with an alkali or converted into a weak alkali catalyst, and formaldehyde is further added to effect again a resol reaction which continues by mixing one or several kinds of natural resin such as rosin, cumarone, etc., at an appropriate time during the reaction. Thereafter, the waste liquid is eliminated and, by adding a solvent such as alcohol, ketone, etc. Moreover, in case a natural resin or a cumarone type resin is not added in the practice of this production method, a liquid phenol-formaldehyde resin composition or a liquid lignin phenol-formaldehyde resin composition may be obtained by a similar treatment. Further, a liquid phenolic resin composition or a liquid lignin phenolic resin composition can be obtained from this method when a natural resin such as rosin, cumarone, etc., is not mixed and is given the same treatment.

A phenolic condensate or a lignin phenolic condensate made by the conventional method will possess high molecular weight and high melting point and will not be adaptable as a binder for shell molding. However, when the acid catalyst concentration is raised and a novolak reaction is effected while controlling the reaction temperature to remain at a relatively low level, the formation of a condensate of above dimer state is arrested and a relatively large amount of monomer is produced and an adequate amount of free phenols will remain in the product. Although the condensate of this condition possesses strong adhesion, it is not practical to use it as a resin material for shell molding because of the very long curing time which it requires to form a perfect tridimensional network, but if the condensate produced by the novolak reaction is neutralized or else converted into a weak alkali catalyst, and resol reaction is effected by further adding formaldehyde, the condensate composed of relatively large amount of monomer and dimer will be changed to one possessing numerous methylol groups, its reactivity will be greatly improved, and this change makes it a suitable resin material for use in shell molding. Of course, it is necessary to restrict the resol reaction to the extent that only a part of the monomer is transformed into a dimer. Otherwise, regardless of its favorable reactivity, the molecular weight of the condensate will become too high and will not serve the purpose for which it is meant. Furthermore, when a natural resin such as rosin, cumarone, etc., is admixed with the reaction mass at an appropriate time during the said resol reaction, it will be controlled to take the condition of being intimately mixed or partially condensed with the pre-formed phenolic condensate or the lignin phenolic condensate composed of a monomer or dimer with numerous methylol groups, and favorable reactivity, and the increase of molecular weight of the formed liquid resin composition will be arrested. Of course, the extent of condensation reaction of both components will depend on the time when the natural resin is added and is executed at any optional stage as may be required, but ordinarily it is desirable to mix just prior to completion of the resol reaction. In this manner, a liquid resin composition, consisting of natural resin or cumarone type resin of relatively low molecular weight is obtained, such liquid resin having good reactivity. As the natural resin employed in this invention is of thermoplastic type, it not only requires a substantial amount of hardener to cure it, but a considerable length of time is needed for curing; furthermore, since it is inferior in strength, it was not suited for use as a binder in shell molding. However, when it is left in a mixed state together with a phenolic condensate or a lignin phenolic condensate with numerous methylol groups and favorable reactivity, by means of resol reaction, the methylol groups of the latter will, together with the hexamethylenetetramine used as a hardener, serve to assist in bridging the natural resin and immensely cut-down the curing time. Furthermore, the amount of hexamethylenetretramine required in this case is slight. If the phenolic condensate or lignin phenolic condensate, which is to be mixed with natural resin, is formed by novolak reaction only, not only will the amount of methylol groups contained in the condensate be small and require a large amount of hardener to cure the thermoplastic liquid phenolic composition mixed with natural resin such as rosin, cumarone, etc., but longer curing time will be needed and together with various other resultant defects this will make it unfit as a resin material for shell molding process.

The resin solids content of the liquid resin composition is about 65 to 80%, which is composed of a phenolic condensate or a lignin phenolic condensate of relatively low molecular weight possessing characteristics of both the novolak and resol as mentioned above and favorable reactivity, and natural resin such as rosin, cumarone, etc., or else this solids content is in the form of a condensate of the condensate and the natural resin. Also, the free phenols and water content are about 7 to 12% and 4 to 8% respectively and as it assists the uniform dispersion of the wax and the hexamethylenetetramine employed when making coated sand and to attain a perfect coating process and, also, serves to restrict a radical condensation reaction, a coating process under controlled conditions is made possible. Aside from this, the water content also restricts evaporation of volatile materials from the liquid resin composition and imparts favorable storage stability to the same. Also, the liquid resin composition formed will possess a viscosity of 10,000 to 20,000 centipoises after dehydration and may be used intact, but if required the viscosity is adequately adjusted by adding a solvent such as alcohol, ketone, etc. Further, this liquid resin composition if used together with a relatively small amount of hexamethylenetetramine will also enable easy production of coated sand by either one of the, so-called, cold, warm, and hot processes and the coated sand thus made will perform its true worth all the more when it is employed in the blow type of shell molding process, which has come to be extensively applied of recent. In this case, the natural resin content such as rosin, cumarone, etc., of the liquid resin composition, even after heat-curing, will still partially maintain its thermoplasticity and, thus, the shell mold made will be free of cracks which is ordinarily caused by sudden heat expansion derived from pouring of high temperature molten metal.

As is already explained in the foregoing lines, the liquid resin composition, which is the subject of this invention, has made possible the production of resin material for shell molding with lignin or natural resin such as rosin, cumarone, etc., as its raw material, and the economical effects of it is great. Particularly, its economical effect may be further increased by employing, as its principal component, the lignin phenolic condensate which is a condensate of the lignin, which is obtained from waste liquid of pulp and practically had no use in the past, and phenols. Furthermore, the liquid resin compositions possess favorable characteristics as resin material for the coated sand, and the coated sand made with the compositions will not absorb moisture and harden, will stand long storage, its setting speed at time of shell molding is high, is free of such defects as peel back, fall down, etc., and is capable of producing shell molds of very high strength. Also, the shell mold made in this manner, although it is exposed to high temperature when molten metal is poured, will show only a slight sign of plasticity and crack occurrence will be prevented.

Moreover, either a simple substance or a mixture of an aromatic compound such as phenol, cresol, etc., for phenols and a simple substance or a mixture of a vegetable type of natural resin such as rosin, copal, shellac, etc., or else a mineral type such as cumarone, indene, etc., for natural resin, may be used in producing the liquid resin composition which is the subject of this invention. Also, the amount of natural resin employed in the liquid resin composition up to 30% will accordingly increase the strength after curing, but if it exceeds 40%, the strength will drop drastically, so actually it is desirable to keep it under 30%. Also, the lignin of the lignin phenolic condensate may be either a simple substance of relatively low molecular weight or a derivative of it, but should over 40% of lignin be employed, free lignin will remain and not only will the yield be poor, but the performance of the formed condensate will deteriorate, so tentatively 40% should be considered the limit. Further, the strength after curing will increase accordingly with the increase of the amount of lignin and natural resin held within this limit of up to 40%, but as the strength will radically decrease when exceeding 60%, the desirable amount is about under 50%.

Examples of this invention are as follows:

Example 1

| | Parts by weight |
|---|---|
| Synthetic phenol | 100 |
| Formalin (38 vol. percent formaldehyde) | 65 |

Mix the above components thoroughly, add about 1.3 parts of hydrochloric acid (10 N) by weight and having a pH of 1, then after subjecting the resulting mixture to a novolak reaction, successively, at 30 to 50° C. for 1 hour, at 50° C. for 1 hour, at 50 to 70° C. for 1 hour, and 70° C. for 3 hours, sodium hydroxide is added to obtain a 7.0 pH, then further adding 20 parts of formalin (38 vol. percent formaldehyde) by weight, the mixture is subjected to a resol reaction for 2 hours at 80° C. Just prior to the completion of this reaction, 40 parts of rosin by weight is mixed with the reaction mass and, after cooling, the waste liquid is eliminated and resin product at the bottom is washed 3 or 4 times with warm water, then it is vacuum dehydrated for 3 to 4 hours, at 60° C. and 60 mm. Hg, and thus a liquid resin composition of a mean molecular weight of 290 to 300 and viscosity of about 11,000 centiposes, composed of 83 to 85% resin solids content by weight, 10 to 11% free phenol by weight and 5 to 6% water content, is obtained.

Example 2

Subsequent to the novolak reaction in Example 1, neutralization is effected, and further adding of,

| | Parts by weight |
|---|---|
| Formalin (38 vol. percent formaldehyde) | 22 |
| Ammonia water (NH$_3$, 16.6%) | 1.5 | the resulting mixture is subjected to a resol reaction for 2 hours at 80° C., and 40 parts of cumarone by weight is added at a halfway stage of this reaction. Thus, when the treatment is followed in accordance with the method in Example 1, a part of the cumarone resin will condensate with the phenolic resin and the major part will be in the mixture in unreacted state. Then, by adding about 20 parts of methanol by weight, a liquid resin composition of a mean molecular weight of 340 to 350 and viscosity of about 6,000 centiposes, composed of 75 to 78% resin solids content by weight, 8 to 10% free phenol by weight, and 5 to 6% water content by weight, is obtained.

*Example 3*

| | Parts by weight |
|---|---|
| Synthetic phenol | 600 |
| Lignin | 250 |

Mix the above two substances thoroughly, add 460 parts of formalin (38 vol. percent formaldehyde) by weight and about 7 parts of hydrochloric acid (10 N) by weight and having a pH 1, then subject the resulting mixture to a novolak reaction successively at 30 to 50° C. for 1 hour, at 50° C. for 1 hour, at 50 to 70° C. for 1 hour, and at 70° C. for 3 hours, sodium hydroxide is added to obtain a 7.0 pH, then further adding 60 parts of formalin (38 vol. percent formaldehyde) by weight, it is subjected to a resol reaction for 2 hours at 70° C. Just prior to the completion of this reaction, 150 parts of rosin by weight is admixed with the reaction mass and, after the waste liquid is eliminated and the resulting resin at the bottom is washed 3 or 4 times with warm water, it is vacuum dehydrated for 3 to 4 hours at 60° C. and 60 mm. Hg, and thus a liquid resin composition of a mean molecular weight of 350 to 370 and viscosity of about 12,000 centipoises, composed of 82 to 85% resin solids content by weight, 10 to 12% free phenol by weight, and 5 to 6% water content by weight, is obtained.

*Example 4*

Subsequent to the novolak reaction in Example 3, the reaction mass is converted to a weakly alkaline state with sodium hydroxide and then 60 parts of formalin (38 vol. percent formaldehyde) by weight is added and resol reaction is effected for 1 hour at 70° C. At a stage halfway during this reaction, 150 parts of cumarone by weight is mixed. Thus, when the treatment is followed in accordance with the method in Example 3, a part of the cumarone resin will condense with the lignin phenol resin and the major part remaining in the mixture in an unreacted state. Then, by adding about 140 parts of methanol by weight, a liquid resin composition of a mean molecular weight of 380 to 400 and a viscosity of about 6,000 centiposes, composed of 70 to 72% resin solids content by weight, 9 to 10% free phenol by weight, 5 to 6% water content by weight, and the remaining part of methanol, is obtained.

Also, when a natural resin is not admixed with the reaction mass in each of the foregoing examples, a liquid phenolic resin composition or a liquid lignin phenolic resin composition may be obtained under the same treatment.

Thus, when a shell mold is manufactured with the coated sand made of the following mixture ratio with the liquid resin composition, given in above examples, and the liquid phenol resin hitherto employed, as its main raw material, the resultant cold and hot strengths of the shell molds made are as follows.

(1) Ratio of mixture:

| | Parts by weight |
|---|---|
| Silica sand | 100 |
| Resin | 4 |
| Hexamethylenetetramine | 0.52 |
| Wax | 0.10 |

(2) Cold strength:

| Resin used | Tensile strength (kg./cm.²) | Bending strength (kg./cm.²) |
|---|---|---|
| Resin in Example 1 | 42–43 | 71–73 |
| Resin in Example 2 | 36–38 | 68–70 |
| Resin in Example 3 | 39–40 | 68–69 |
| Resin in Example 4 | 32–34 | 65–67 |
| Phenol resin | 34–35 | 67–68 |

(3) Hot strength (when exposed for 1 minute at 1,200° C.):

| Resin used: | Compressive strength (kg./cm.²) |
|---|---|
| Resin in Example 1 | 15–16 |
| Resin in Example 2 | 14–15 |
| Resin in Example 3 | 13–14 |
| Resin in Example 4 | 10–12 |
| Phenol resin | 12–13 |

I claim:
1. A method for producing a liquid resin composition for use in shell molding, consisting essentially of
   (1) heating formaldehyde and a phenol, in proportions sufficient for obtaining a novolak reaction, in the presence of an acid catalyst corresponding in strength to about 10 N-hydrochloric acid, at a temperature of about 30° to 70° C.,
   (2) adjusting the pH of the resulting novolak resin to about 7, and
   (3) adding an excess of formaldehyde thereto sufficient to obtain a resol reaction, and heating the mixture at a temperature of at most about 80° C., thereby effecting the resol reaction; and admixing with the reaction mixture at one of the aforesaid stages a member selected from the group consisting of rosin and cumarone.

2. A method for producing a liquid resin composition for use in shell molding, consisting essentially of
   (1) heating formaldehyde and a phenol, in proportions sufficient for obtaining a novolak reaction, and at most 40% of lignin calculated on the weight of the composition, in the presence of an acid catalyst of about pH 1, at a temperature of about 30° to 70° C.,
   (2) adjusting the pH of the resulting novolak resin to about 7, and
   (3) adding an excess of formaldehyde thereto sufficient to obtain a resol reaction, and heating the mixture at a temperature of at most about 80° C., thereby effecting the resol reaction; and admixing with the reaction mixture at one of the aforesaid stages a member selected from the group consisting of rosin and cumarone.

3. In a method for producing a liquid resin composition for use in shell molding, the improvement consisting of
   (1) heating formaldehyde and a phenol, in proportions sufficient for obtaining a novolak reaction, in the presence of an acid catalyst of about pH 1, at a temperature of about 30° to 70° C.,
   (2) adjusting the pH of the resulting novolak resin to about 7, and
   (3) adding an excess of formaldehyde thereto sufficient to obtain a resol reaction, and heating the mixture at a temperature of at most about 80° C., thereby effecting the resol reaction, and adding rosin during the latter reaction.

4. In a method for producing a liquid resin composition for use in shell molding, the improvement consisting of
   (1) heating formaldehyde and a phenol, in proportions sufficient for obtaining a novolak reaction, and at most 40% of lignin calculated on the weight of the composition, in the presence of an acid catalyst of about pH 1, at a temperature of about 30° to 70° C.,
(2) adjusting the pH of the resulting novolak resin to about 7, and
(3) adding an excess of formaldehyde thereto sufficient to obtain a resol reaction, and heating the mixture at a temperature of at most about 80° C., thereby effecting the resol reaction; and
(4) admixing with the reaction mixture during step (3) a member selected from the group consisting of rosin and cumarone.

5. The method claimed in claim 2 wherein the member is rosin and the total amount of lignin and rosin is at most 50% calculated on the weight of the composition.

References Cited by the Examiner
UNITED STATES PATENTS

| | | | |
|---|---|---|---|
| 2,678,961 | 5/54 | Uhlig et al. | 260—25 |
| 2,732,368 | 1/56 | Shepard | 260—25 |
| 2,913,787 | 11/59 | Cooper | 260—17.5 |
| 2,956,033 | 10/60 | Apel et al. | 260—17.5 |

FOREIGN PATENTS

| | | |
|---|---|---|
| 200,453 | 12/55 | Australia. |
| 515,807 | 8/55 | Canada. |
| 729,220 | 5/55 | Great Britain. |

WILLIAM H. SHORT, *Primary Examiner.*

A. M. BOETTCHER, A. RIMINS, MILTON STERMAN, *Examiners.*